United States Patent
Pfeiffer et al.

(10) Patent No.: US 10,476,344 B2
(45) Date of Patent: Nov. 12, 2019

(54) ELECTROMECHANICAL ACTUATING DRIVE

(71) Applicant: ZF Friedrichshafen AG, Friedrichshafen (DE)

(72) Inventors: Daniel Pfeiffer, Berg (DE); Martin Hoffmann, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 388 days.

(21) Appl. No.: 15/323,468

(22) PCT Filed: Jun. 9, 2015

(86) PCT No.: PCT/EP2015/062800
§ 371 (c)(1),
(2) Date: Jan. 3, 2017

(87) PCT Pub. No.: WO2016/005127
PCT Pub. Date: Jan. 14, 2016

(65) Prior Publication Data
US 2017/0149302 A1 May 25, 2017

(30) Foreign Application Priority Data
Jul. 9, 2014 (DE) .......................... 10 2014 213 323

(51) Int. Cl.
*H01R 13/62* (2006.01)
*H02K 5/22* (2006.01)
(Continued)

(52) U.S. Cl.
CPC ......... *H02K 5/225* (2013.01); *B60G 17/0162* (2013.01); *B60R 16/0215* (2013.01)

(58) Field of Classification Search
CPC .... H02K 5/225; H01R 13/506; H01R 13/434; H01R 13/5845; B60R 16/0215; B60G 17/0162; B60G 2202/42
(Continued)

(56) References Cited

U.S. PATENT DOCUMENTS 5,234,358 A * 8/1993 Polgar .................. H01R 13/506
439/465
8,833,778 B2 9/2014 Khanlarov
(Continued)

FOREIGN PATENT DOCUMENTS

DE 10 2012 110 656 A1 5/2014
DE 10 2012 107 507 A1 6/2014
(Continued)

OTHER PUBLICATIONS

German Search Report Corresponding to 10 2014 213 323.8 dated Apr. 21, 2016.
(Continued)

*Primary Examiner* — Jean F Duverne
(74) *Attorney, Agent, or Firm* — Davis & Bujold PLLC; Michael J. Bujold

(57) ABSTRACT

An electromechanical actuating drive (1) having a servomotor (2) arranged so that the servomotor (2) can rotate about its longitudinal axis in a vehicle, and a cable harness (3) having first and second ends. A first end of the harness (3) is connected to the servomotor (2) and the harness (3) extends, in an elastically deformable arc, from the first end to the second end. The second end of the harness (3) is positionally fixed in the vehicle. The second end of the cable harness (3) is clamped in a securing and deflecting device at a transfer point (5).

17 Claims, 5 Drawing Sheets

(51) Int. Cl.
*B60G 17/016* (2006.01)
*B60R 16/02* (2006.01)

(58) Field of Classification Search
USPC .......................................... 439/367
See application file for complete search history.

(56) References Cited

U.S. PATENT DOCUMENTS

| | | | |
|---|---|---|---|
| 8,905,414 B2 | 12/2014 | Khanlarov et al. | |
| 9,768,548 B2 * | 9/2017 | Pegel | H01R 13/5845 |
| 10,056,718 B2 * | 8/2018 | Dang | H01R 13/434 |
| 2016/0193892 A1 | 7/2016 | Pfeiffer et al. | |

FOREIGN PATENT DOCUMENTS

| | | |
|---|---|---|
| DE | 10 2013 107 351 A1 | 1/2015 |
| DE | 10 2013 215 859 A1 | 2/2015 |

OTHER PUBLICATIONS

International Search Report Corresponding to PCT/EP2015/062800 dated Sep. 16, 2015.
Written Opinion Corresponding to PCT/EP2015/062800 dated Sep. 16, 2015.

* cited by examiner

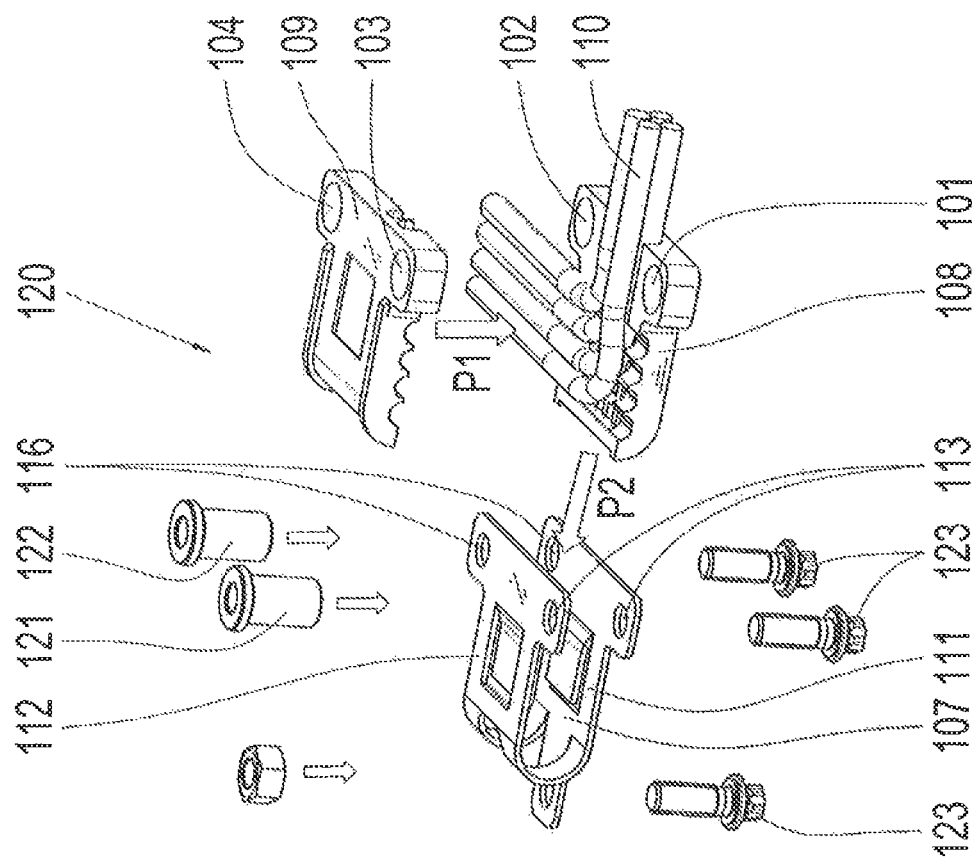
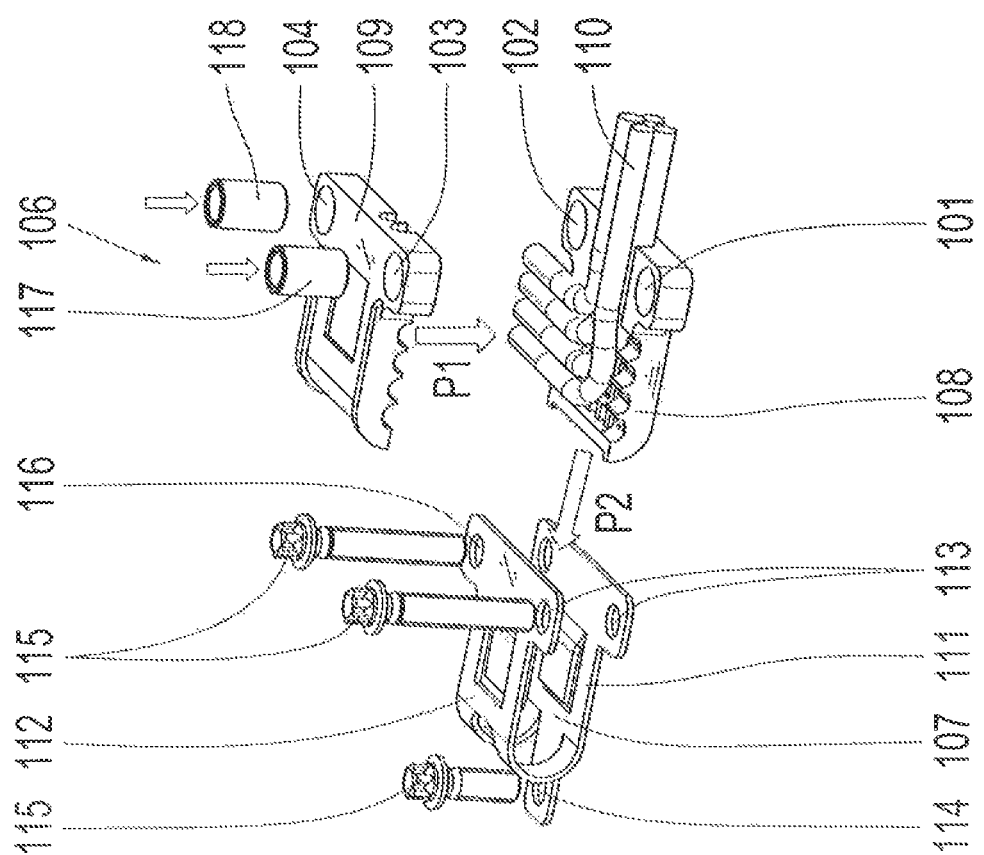

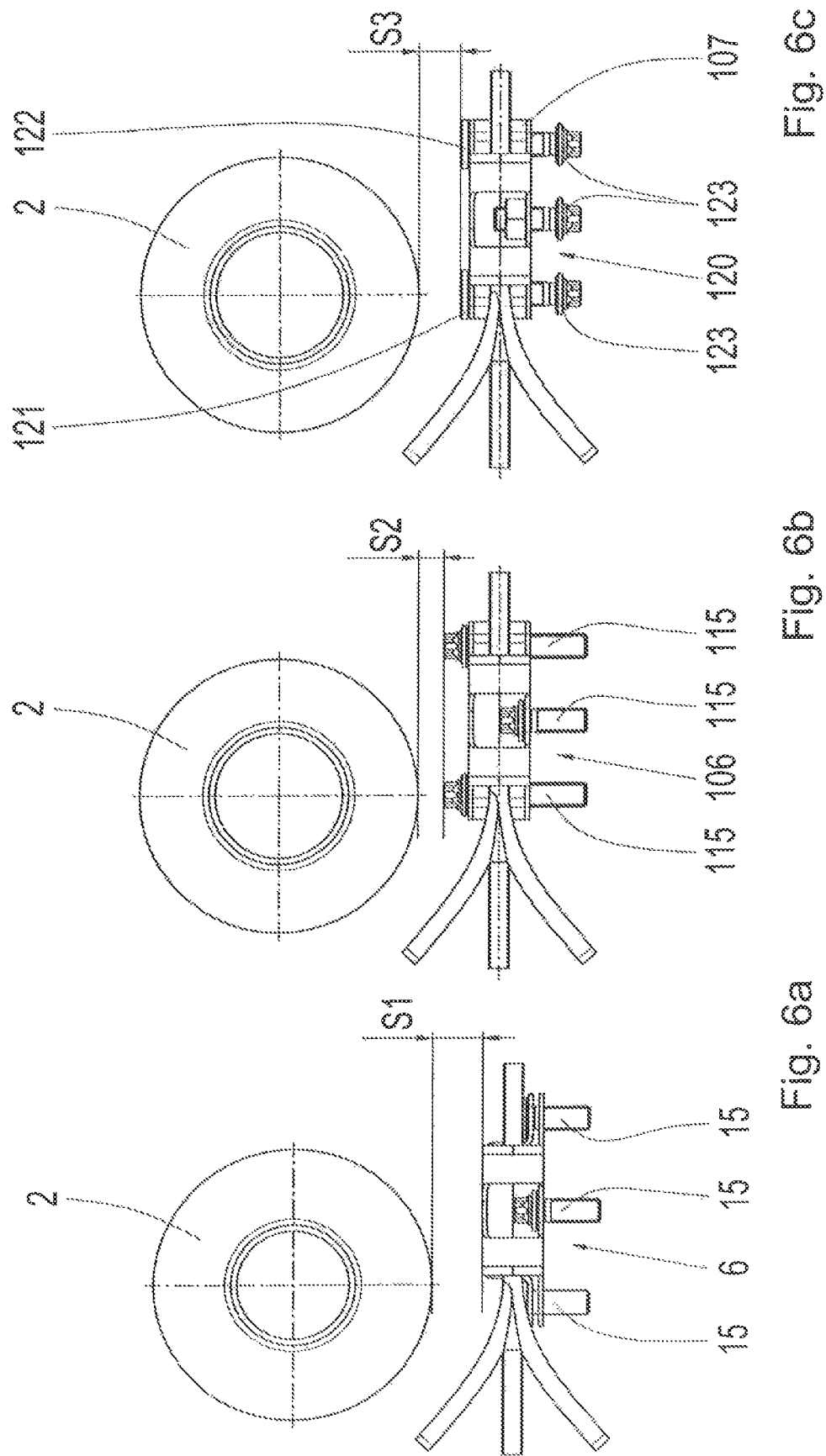

ary, the insert components are made of plastic and are designed symmetrically.

ELECTROMECHANICAL ACTUATING DRIVE

This application is a National Stage completion of PCT/EP2015/062800 filed Jun. 9, 2015, which claims priority from German patent application serial no. 10 2014 213 323.8 filed Jul. 9, 2014.

FIELD OF THE INVENTION

The invention concerns an electromechanical actuating drive comprising a servomotor drive (actuator) which is arranged in a vehicle and able to rotate about its longitudinal axis and a cable harness having a first and a second end, which is connected to the servomotor at its first end, extends in an elastically deformable arc from its first to its second end, and at its second end is positionally fixed and deflected in the vehicle.

BACKGROUND OF THE INVENTION

The earlier application by the present applicant, with file number 10 2013 215 859.9, discloses an electromechanical servomotor drive for the active roll stabilization of a vehicle. The servomotor drive comprises an actuator in the form of an electric motor with a planetary gearset, also referred to just as the actuator, to one end of which is connected a cable harness that consists of power cables and a signal or sensor cable. The cable harness has a first end which is connected to the actuator by way of a first connector or first plug, and extends from the first connector, in a curve around the longitudinal axis of the actuator, to its second end, which is in the form of a second plug and is fixed onto the vehicle. During active stabilization the actuator and hence the first end of the cable harness undergoes a rotational or swiveling movement about the longitudinal axis, whereas the second end of the cable harness is arranged in a fixed position. This allows the cables to 'breathe', i.e. the curvature of the cable harness can be varied between its two ends.

SUMMARY OF THE INVENTION

Starting from this prior art according to the earlier application, the purpose of the present invention is to further improve the guiding of the cable harness.

The objective is achieved by an electromechanical servomotor drive, in particular designed for the electromechanical roll stabilization of a motor vehicle, preferably by virtue of a roll stabilization system for a motor vehicle having an electromechanical servomotor drive with a servomotor arranged in the vehicle and able to rotate about its longitudinal axis, which motor operates within the housing of the servomotor drive, and having a cable harness with a first and a second end, which is connected at its first end to the servomotor, extends from the first end in an elastically deformable arc to its second end, and at its second end is positionally fixed in the vehicle, the second end of the cable harness being clamped in a securing and deflecting device.

According to the invention the second end of the cable harness is laid in and clamped into a securing and deflecting device. By virtue of this securing and deflecting device the "dynamic" portion of the cable harness, i.e. the moving or 'breathing' part, is held at a positionally fixed point in the vehicle and runs on from there as a "static" cable harness, for example to an electronic control unit arranged in the vehicle. The purpose of the fixing and deflecting device is to prevent uncontrolled movements of the cables relative to one another, such as chafing. Furthermore, the securing and deflecting device ensures that the deflection takes place in a controlled manner, i.e. with a bending radius that does not damage the cables.

According to a preferred embodiment, the device has a first and a second insert component, which serve to fix and/or deflect the individual cables. The cables are laid between the insert components and clamped therein. Preferably, the insert components are made of plastic and are designed symmetrically.

In a further preferred embodiment the device comprises a clamping and holding plate for holding the two insert components. Thus, the clamping and holding plate encloses both insert components and the cables arranged between the insert components, and braces them one against the other.

According to another preferred embodiment the clamping and holding plate comprises fixing means for fixing to the vehicle. Preferably, the fixing means are in the form of perforated tabs. This allows the securing and deflecting device to be fitted at a freely chosen location in the vehicle. Fixing is preferably done by means of detachable securing means, for example fixing screws, so that the device can also be taken off to allow the option of final adjustment. This can be advantageous, in particular for the free cable lengths between the first end of the cable harness connected to the actuator and the second, positionally fixed end thereof, if defects or shortcomings are observed after the initial assembly.

According to a further preferred embodiment, the cable harness comprises a plurality of cables assembled together to form the cable harness. In the securing and deflecting device, however, the cables are positioned individually between the two insert components. For this purpose the insert components preferably have guide grooves or guiding contours that enable exact guiding and positioning of the individual cables.

According to a further preferred embodiment, the securing and deflecting device has an inlet side and two outlet sides opposite one another for the cables. The cables are passed into the device on the inlet side and emerge from it on an outlet side, in such manner that the cables can either pass straight through the device, i.e. without changing direction, or they can be deflected through about 90 degrees and preferably exactly 90 degrees. In the straight-through case the inlet side is opposite the outlet side.

In another preferred embodiment the cables, also referred to as conductors, are bunched in at least two planes, i.e. bunched next to one another or one above another, i.e. they are output in two planes one above the other. On the inlet side the cables or conductors run in one plane which, in particular, extends parallel to the housing of the actuating drive. This enables a compact structure for the securing and deflecting device.

According to a further preferred embodiment, the clamping and holding plate is formed by bending a strip of sheet metal into a U-shaped stirrup, i.e. it is made as a one-piece sheet component. This enables it to be produced simply and inexpensively by a sheet-bending operation.

According to a further preferred embodiment, the arms of the sheet-metal stirrup have punched-out portions directed inward, i.e. toward the insert components, these having a fastening element in the form of a tab or tongue. Correspondingly, the insert components have recesses or depressions in which the punched-out tongues engage. In this way the insert components are at least temporarily fixed in the clamping and holding plate.

In a further preferred embodiment, at the free ends of the U-shaped stirrup two fixing holes in each case are provided, and on the outlet sides of the insert components two respective through-holes aligned with the fixing holes are arranged. This enables the assembled insert components to be connected with interlock by means of fixing means to the clamping and holding plate. At the same time, by virtue of these fixing screws the necessary prestressing of the two insert components against one another is ensured.

According to another preferred embodiment, in the apex area of the stirrup a tab with a further fixing hole is punched out. This provides an additional fixing point for the clamping and holding plate.

In a further preferred embodiment, spacer sleeves or threaded sleeves can be fitted into the through-holes of the insert components. This provides a variety of fixing and bracing options. By virtue of the spacer sleeves a defined distance between the arms of the stirrup and hence a defined bracing of the insert components is maintained. The threaded sleeves provide the possibility of arranging the screw heads on the opposite side.

According to a further preferred embodiment the clamping and holding plate, including the two insert components and the clamped cables, can be fixed in the vehicle at three fixing points by means of three fixing screws. In this way the securing and deflecting device can be fitted simply into the vehicle and fixed therein, so that—as mentioned earlier—the possibility of removing it and subsequently adjusting the cable positions is made available.

In a further preferred embodiment, in the area of the guide grooves on both the inlet and the outlet sides pressure ridges are provided, which slightly compress the cables and hold them in place by friction. This serves to relieve any tensile stress so that if a tensile load is applied, the cables are not pulled out of the securing and deflecting device.

BRIEF DESCRIPTION OF THE DRAWINGS

Example embodiments of the invention are illustrated in the drawing and will be described in more detail below, so that from the description and/or the drawing further features and/or advantages may emerge. The figures show:

FIG. 5a: A securing and deflecting device with spacer sleeves, FIG. 5b: A securing and deflecting device with threaded sleeves, FIGS. 6a to 6c: Various securing and deflecting devices and their distance from the actuator.

DETAILED DESCRIPTION OF THE PREFERRED EMBODIMENTS

Figure 1:
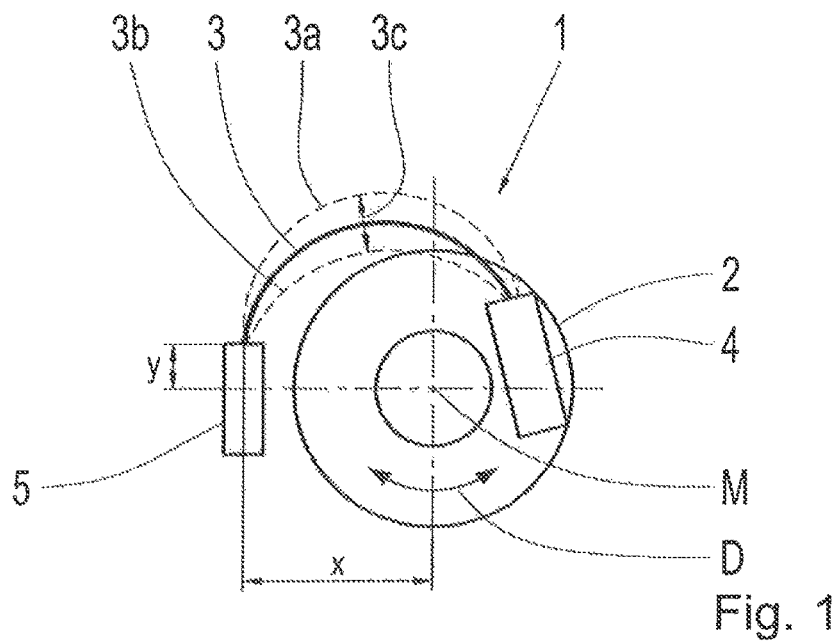
FIG. 1: An electromechanical actuating drive with actuator and cable connection.

FIG. 1 shows a schematic representation of an electromechanical actuating drive 1 having a servomotor 2, also referred to as the actuator 2, which is arranged in a motor vehicle (not shown) in such manner that it can rotate about its longitudinal axis as indicated by the rotation arrow D. The servomotor 2 comprises an electric motor and a step-down planetary gearset and is connected—again not shown to stabilizer halves for the purpose of roll stabilization. A cable harness 3 is connected to the electric motor 2 by way of a plug 4 arranged at one end thereof. Starting from the plug 4 on the motor, the cable harness 3 extends in an arc as far as a transfer point 5 fixed on the vehicle, whose position is defined by the coordinates x, y in relation to the longitudinal axis of the electric motor 2 represented by its mid-point M. From the transfer point 5 the cable harness 3 passes on into the vehicle (not shown). By virtue of the rotation or swiveling movement indicated by the rotation arrow D, the plug 4 and hence the first end of the cable harness 3 attached to the motor can move along a circular arc about the mid-point M, whereas the second end of the cable harness 3, attached to the vehicle, is connected to the transfer point 5 and is therefore positionally fixed. By virtue of this relative movement the shape of the curve described by the cable harness 3 changes in such manner that it assumes an upper end position denoted by the broken line 3a or a lower end position denoted by the broken line 3b. This corresponds to a "stroke" 3c between the two end positions 3a, 3b. This is referred to as the so-termed 'breathing' of the cables, as already described in the older application mentioned earlier, to which reference is made here. The older application with file number 10 2013 215 859.9 is incorporated by reference—thereto—in its entirety in the disclosure content of the present application. It can be seen that the position of the transfer point 5 is important for determining the shape of the arc formed by the cable harness 3.

Figure 2:
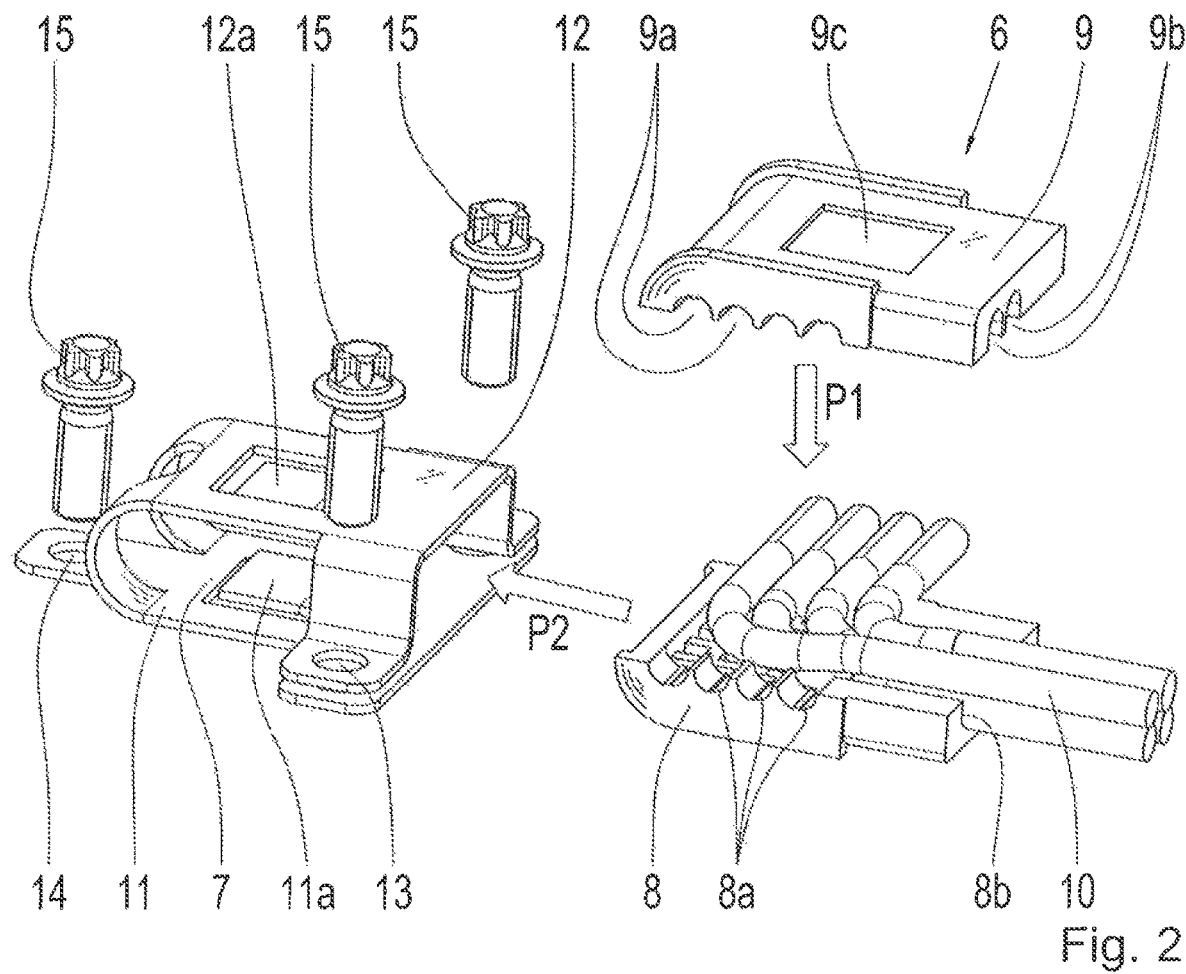
FIG. 2: A securing and deflecting device for cables of the actuating drive.

FIG. 2 shows a perspective view of a securing and deflecting device 6 separated into its individual parts. The securing and deflecting device 6, also referred to for short in what follows as the device 6, is positioned at the transfer point 5 (FIG. 1) and—as its name implies—serves on the one hand to secure the cable harness 3 (FIG. 1) and pass the cables farther on or deflect them. The device 6 comprises a clamping and holding plate 7, a first, lower insert component 8 and a second, upper insert component 9, between which four cables are laid. Each of the insert components 8, 9 has guide grooves 8a, 8b, 9a, 9b by which the cables 10 are held in position. By virtue of their arrangement in the cable harness 3 (FIG. 1) the cables 10 on the inlet side of the device 6 are arranged in a row or plane parallel and next to one another, and are then deflected through 90 degrees and are arranged on the outlet side in two planes, namely with two cables underneath and two cables on top, i.e. in a bunch. On its outside the upper insert component 9 has a recess 9c of rectangular shape. An analogous recess is arranged on the underside (obscured) of the lower insert component 8. To relieve tensile stresses in the cables, on their inlet and outlet sides the insert components 8, 9 have pressure ridges (not shown) in the area of the guide grooves 8a, 8b, 9a, 9b, which ridges hold the cables 10 by friction in the securing and deflecting device 6.

The clamping and holding plate 7 is made in one piece from a strip of sheet metal by deformation, in particular stamping and bending. The clamping and holding plate 7, also referred to for short in what follows as the plate 7, is bent into a U-shape and has two U-arms 11, 12 arranged parallel to one another. On their flat areas the U-arms have punched-out portions 11a, 12a in the form of tabs or tongues, which engage in the recesses 9c of the insert components 8, 9 to form interlocking fastening or fixing elements. At their free ends the U-arms 11, 12 have tabs (part of which is angled outward) with fixing holes 13. In the area of the curve of the plate 7 another tab with a further fixing hole 14 is punched out. For the fixing holes 13, 14 (here, the third hole is not visible) fixing screws 15 are provided.

For assembly, the upper insert component 9 is lowered onto the cables 10 and the lower insert component 8 as shown by the arrow P1. The two insert components 8, 9 are held together and then pushed as indicated by the arrow P2 between the U-arms 11, 12, which—contrary to the representation in the drawing—have to be bent outward to allow this. Thereafter, the U-arms 11, 12 spring back again so that the punched-out portions 11a, 12a can engage in the recesses 9c of the insert components 8, 9. The device 6 is then attached to the vehicle by means of the fixing screws 15.

Figures 3A, 3B, 3C:
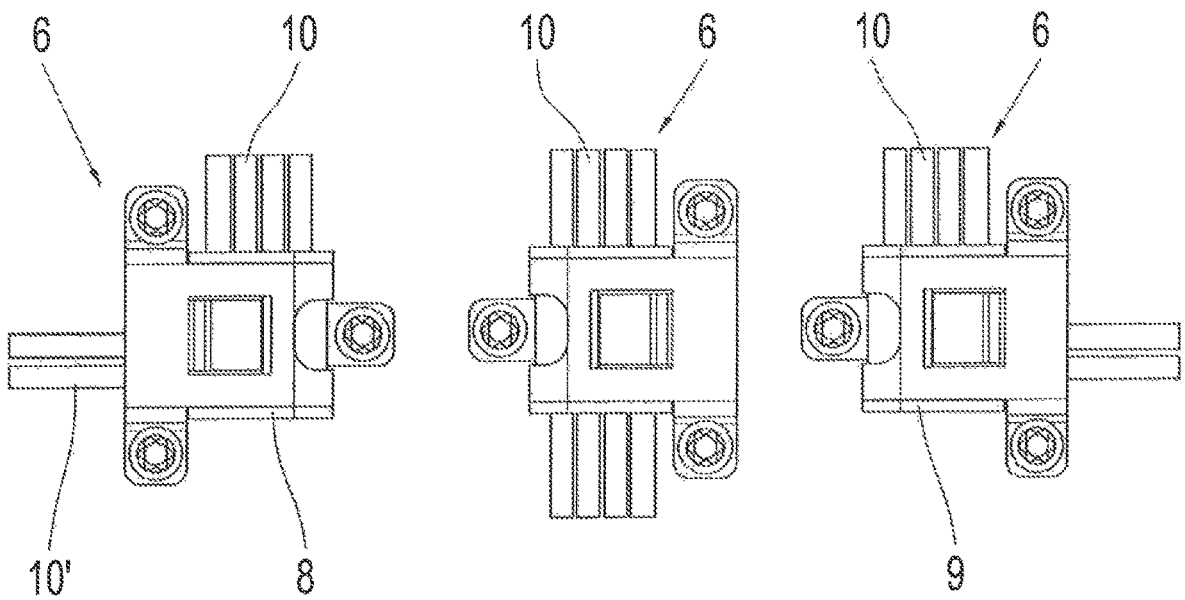
FIG. 3a: The securing and deflecting device showing a deflection to the right (cable outlet on the left)
FIG. 3b: The securing and deflecting device showing a straight-through cable run.
FIG. 3c: The securing and deflecting device showing a deflection to the left (cable outlet on the right)

FIGS. 3a, 3b and 3c show three possible ways of guiding the cables using the same securing and deflecting device 6. In FIG. 3a four cables 10 next to one another, i.e. in one plane, are inserted into the device 6, these cables 10 corresponding to the second end of the dynamically laid cable harness 3. Starting from the inlet side of the device 6, the cables 10 are deflected to the right, i.e. in the drawing the outlet of the cables 10' bunched in two planes on the left. In FIG. 3b the cables 10 are straight, i.e. they pass through the device 6 without changing direction. In FIG. 3c, which is a mirror-image of FIG. 3a, the cables 10 are deflected to the left, i.e. the outlet is on the right in the drawing. The insert components 8, 9 (see FIG. 2) are designed symmetrically in their outer dimensions and can therefore be rotated or turned through 180 degrees, so that—compared with FIG. 2—the upper insert component 9 is at the bottom and the lower insert component 8 is at the top. In relation to the deflection FIG. 3c corresponds to FIG. 2, i.e. the insert component 9 is at the top, as indicated in FIG. 3c by the index 9. In FIG. 3a the insert component 8 (the lower one in FIG. 2) is at the top.

Figure 4:
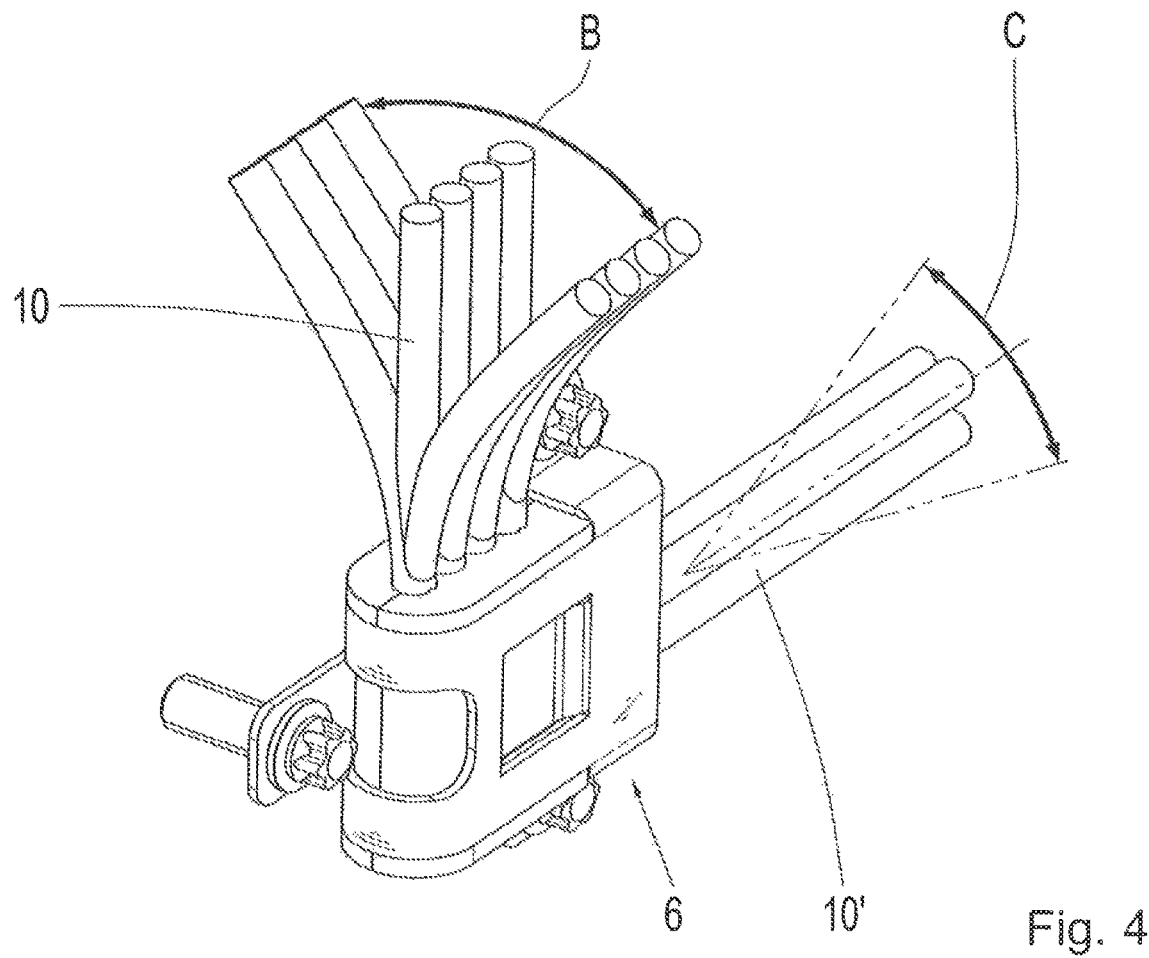
FIG. 4: A perspective view of the securing and deflecting device.

FIG. 4 shows a perspective view of the securing and deflecting device 6, with four cables 10 arranged in a plane on the inlet side and the cables 10' emerging in a bunch on the outlet side. On the inlet side a curved arrow B indicates the freedom of movement, shown as the angle through which the cables can move. As already mentioned, the four cables 10 arranged next to one another correspond to the cable harness 3 as in FIG. 1. In the cable harness 3 the cables are arranged next to one another in one plane, so that all the cables have the same bend radius—so giving a controlled shape of the arc-shaped curvature and in particular no twisting of the cable harness. After the 90-degree deflection in the device 6 according to FIG. 4 the cables 10' are bunched together, whereby some structural space is gained. As indicated by the further curved arrow C, the direction of the bunched cables 10' can also be varied although the bunched cables are laid statically in the vehicle.

Figure 5C:
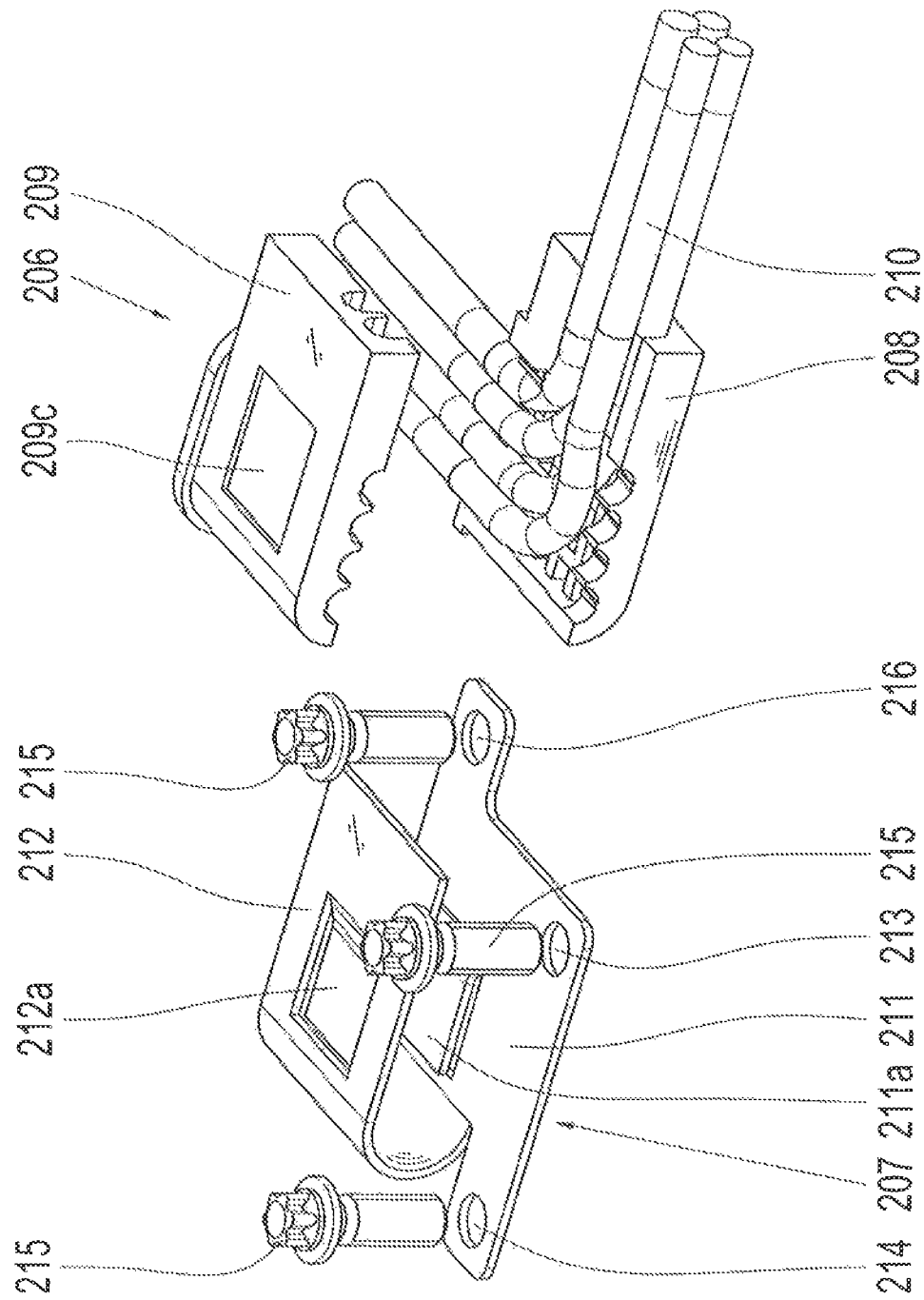
FIG. 5c: Another design of the securing and deflecting device.

FIGS. 5a, 5b and 5c show further example embodiments of the invention, which are variants of the securing and deflecting device 6 shown in FIG. 2. FIG. 5a shows a securing and deflecting device 106, with the same or analogous components as in FIG. 2 indexed with numbers increased by 100. The clamping and holding plate 107 has two U-arms 111, 112 arranged parallel to one another, which at their free ends have fixing holes 113, 116. The insert components 108, 109 each have, at the side of the cable bunch 110, through-holes 101, 102, 103, 104 into which spacer sleeves 117, 118 can be inserted. As indicated by the arrow P1 the two insert components 108, 109 are joined to the spacer sleeves 117, 118 and then, with the cables 110 in place, pushed into the laterally open clamping and holding plate 107 as shown by the arrow P2 until the fixing holes 113, 116 are aligned with the holes of the threaded sleeves 117, 118. A temporary fixing or retention is enabled by punched-out tabs 12a (not shown in FIG. 5a) in combination with the recess 9c, as shown in FIG. 2. The pre-assembled securing and deflecting device 106 can then be fixed in the vehicle at the transfer point 5 (see FIG. 1) using the fixing screws 115. By using the spacer sleeves 117, 118 a defined distance between the U-arms 111, 112 is maintained, so that excessive pressure on the cables 110 is avoided.

FIG. 5b shows a further securing and deflecting device 120, which to a large extent has the same components as the example embodiment according to FIG. 5a, which are therefore given the same indexes. Otherwise than in the example embodiment according to FIG. 5a, in the securing and deflecting device 120 threaded sleeves 121, 122 are used, which at their top ends have a collar (not indexed). The pre-assembled insert components 108, 109 with the cables 110 in place are pushed into the laterally open clamping and holding plate 107 as shown by the arrow P2, until the fixing holes 101 to 104 are aligned with the fixing holes 113, 116. Then the threaded sleeves 121, 122 are inserted and from the underside fixing screws 123 are screwed into the threaded sleeves 121, 122. At the same time the threaded sleeves act as spacer sleeves between the U-arms 111, 112, so that the pressure on the two plastic insert components 108, 109 is defined.

FIG. 5c shows another example embodiment of a securing and deflecting device 206, with the same or analogous components indexed with numbers increased by 200. The clamping and holding plate 207 is bent into a U-shape and has two U-arms 211, 212 arranged parallel to one another, with fixing holes 213, 214, 216 provided only in the lower U-arm. The two U-arms are elastically internally stressed and therefore act as a clip or a spring grip (the same applies analogously to the clamping and holding plate 107 in FIGS. 5a and 5b). For fixing the device 206 in the vehicle, fixing screws 215 are provided. Analogously to the example embodiment according to FIG. 2, the two U-arms 211, 212 have punched-out portions 211a, 212a which serve for the fixing of the two insert components 208, 209. Otherwise than in the example embodiments according to FIGS. 5a, 5b, the insert components have no through-holes; rather, the two insert components 208, 209 are fixed in the clamping and holding plate 207 by means of the punched-out portions 211a, 212a in combination with the recesses 209c, whereby a snap or detent connection is formed. In this pre-fitted condition the device 206 can be fixed into the vehicle.

FIGS. 6a, 6b and 6c show a comparison of the various embodiments at a cable transfer point as regards their distances S1, S2, S3 from the actuator 2 as shown in FIG. 1. FIG. 6a shows the example embodiment according to FIG. 2, in which the screw heads of the fixing screws 15 are under the upper edge of the upper U-arm 12a. Accordingly, compared with the other versions the distance S1 to the circumference of the actuator 2 is a maximum.

FIG. 6b shows the distance S2 for the securing and deflecting device 106 according to FIG. 5a. The screw heads of the fixing screws 155 project above the clamping and holding plate 107 and therefore reduce the distance from the actuator 2. It can be seen that S2 is smaller than S1 (FIG. 6a), FIG. 6c shows the securing and deflecting device 120 according to FIG. 5b and its distance from the actuator 2. Although the screw heads of the fixing screws 123 are on the underside of the clamping and holding plate 107, as a result of the collar of the threaded sleeves 121, 122 the distance S3 is smaller compared with S1.

All in all, for FIGS. 6a, 6b, 6c respectively the relation S1>S2>S3 applies, the largest distance S1 being the most advantageous.

INDEXES

1 Actuating drive
2 Servomotor
3 Cable harness
3a Upper end position
3b Lower end position
3c Stroke
4 Plug
5 Transfer point
6 Securing and deflecting device
7 Clamping and holding plate
8 First insert component
8a Guide grooves
8b Guide grooves
9 Second insert component
9a Guide grooves
9b Guide grooves
9c Recess
10 Cables
10' Cables (emerging)
11 U-arm
11a Punched-out portion
12 U-arm
12a Punched-out portion
13 Fixing hole
14 Fixing hole
15 Fixing screw
101 Fixing hole
102 Fixing hole
103 Fixing hole
104 Fixing hole
106 Securing and deflecting device
107 Clamping and holding plate
108 First insert component
109 Second insert component
110 Cables
111 U-arm
112 U-arm
113 Fixing holes
114 Fixing hole
115 Fixing screw
116 Fixing holes
117 Spacer sleeve
118 Spacer sleeve
120 Securing and deflecting device
121 Threaded sleeve
122 Threaded sleeve
123 Fixing screw
206 Securing and deflecting device
207 Clamping and holding plate
208 First insert component
209 Second insert component
209c Recess
210 Cables
211 U-arm
211a Punched-out portion
212 U-arm
212a Punched-out portion
213 Fixing hole
214 Fixing hole
215 Fixing screw
216 Fixing hole B Double arrow
C Double arrow
D Rotation arrow
M Mid-point (longitudinal axis)
P1 Joining direction
P2 Assembly direction
S1 Distance
S2 Distance
S3 Distance
x, y Coordinates

The invention claimed is:

1. An electromechanical actuating drive comprising:
a servomotor being arranged in a vehicle and able to rotate about a longitudinal axis;
a cable harness having a first end and a second end, the first end of the cable harness being connected to the servomotor, the cable harness extending from the first end, in an elastically deformable arc, to the second end, and the second end of the cable harness being positionally fixed in the vehicle;
a securing and deflecting device having first and second insert components which couple to clamp the second end of the cable harness therebetween;
a clamping and holding plate comprising first and second planar arms that extend at least substantially parallel to each other; and
the first and the second planar arms of the clamping and holding plate receiving the first and the second insert components of the securing and deflecting device therebetween and clamping the first and the second insert components to each other to clamp the second end of the cable harness between the first and the second insert components.

2. The electromechanical actuating drive according to claim 1, wherein the securing and deflecting device having an inlet side through which the cable harness extends from the securing and deflecting device to the servomotor.

3. The electromechanical actuating drive according to claim 2, wherein the clamping and holding plate being fixable to vehicle independent of the first and the second insert components.

4. The electromechanical actuating drive according to claim 3, wherein the clamping and holding plate has fixing means for fixing the clamping and holding plate to the vehicle, and the fixing means are tabs that extend from the first and the second planar arms such that fixing holes of the tabs of the first planar arm align with fixing holes of the tabs of the second planar arm.

5. The electromechanical actuating drive according to claim 2, wherein the cable harness comprises individual cables and the individual cables are laid between the first and the second insert components, and the first and the second insert components have guide grooves for holding and deflecting the individual cables, the guide grooves are aligned such that, on the inlet side of the securing and deflecting device, the individual cables are arranged parallel to each other in only one plane.

6. The electromechanical actuating drive according to claim 1, wherein the securing and deflecting device has an inlet side and first and second outlet sides, the cable harness comprises a plurality of cables, and the plurality of cables extend from the servomotor in through the inlet side of the securing and deflecting device and out through the first outlet side of the securing and deflecting device.

7. The electromechanical actuating drive according to claim 6, wherein the plurality of cables, on the inlet side, are arranged in only one plane and, on the first outlet side, the plurality of cables are deflected and arranged in at least two planes.

8. The electromechanical actuating drive according to claim 7, wherein a deflection angle, between a direction of the plurality of cables on the inlet side and a direction of the plurality of cables on the first outlet side, is approximately 90 degrees.

9. The electromechanical actuating drive according to claim 3, wherein the clamping and holding plate is made by bending a planar sheet to form a U-shaped stirrup with the first and the second planar arms being connected by a curved plate segment.

10. The electromechanical actuating drive according to claim 9, wherein the first and the second planar arms each have a punched-out portion forming a tab which engages in a recess in a corresponding one of the first and the second insert components.

11. The electromechanical actuating drive according to claim 9, wherein fixing holes are arranged at a remote end of each of the first and the second planar arms, and each of the first and the second insert components has two through-holes, which align with the fixing holes of the first and the second planar arms.

12. The electromechanical actuating drive according to claim 11, wherein the curved plate segment comprises a tab that extends therefrom and is coplanar with the first planar arm, and the tab of the curved plate segment comprises a further fixing hole.

13. The electromechanical actuating drive according to claim 11, wherein either spacer sleeves or threaded sleeves are insertable into the through-holes.

14. The electromechanical actuating drive according to claim 11, wherein the clamping and holding plate, together with the first and the second insert components and with cables of the cable harness in place, are fixable to the vehicle by at least two fixing screws which pass through the two through-holes and the fixing holes.

15. The electromechanical actuating drive according to claim 6, wherein the inlet and the outlet sides of the securing and deflecting device comprise guide grooves having ridges which apply pressure and hold the plurality of cables, when the clamping and holding plate clamps the first and the second insert components to each other.

16. The electromechanical actuating drive according to claim 2, wherein the cable harness comprises a plurality of cables that pass from the servomotor to an interior of the securing and deflecting device through the inlet side, and the plurality of cables being parallel and coplanar when passing through the inlet side of the securing and deflecting device.

17. An electromechanical actuating drive comprising:
a servomotor of a vehicle, and the servomotor being rotatable about a longitudinal axis;
a cable harness having a first end and a second end, the first end of the cable harness being connected to the servomotor, the cable harness extending from the first end, in an elastically deformable arc, to the second end, and the second end of the cable harness being fixed in position relative to the vehicle;
the second end of the cable harness being clamped in a securing and deflecting device; and
the cable harness comprising a plurality of individual cables that extend from the servomotor and pass into the securing and deflecting device through an inlet, the plurality of individual cables passing through the inlet in only one plane, the plurality of individual cables pass out of the securing and deflecting device through an outlet, and the plurality of individual cables passing through the outlet in at least two planes.

* * * * *